United States Patent
Cheng et al.

(10) Patent No.: US 11,922,611 B2
(45) Date of Patent: Mar. 5, 2024

(54) METHODS AND SYSTEMS FOR ACCELERATED IMAGE RENDERING WITH MOTION COMPENSATION

(71) Applicant: Pixelworks Semiconductor Technology (Shanghai) Co. Ltd., Shanghai (CN)

(72) Inventors: Guohua Cheng, Shanghai (CN); Junhua Chen, Shanghai (CN); Neil Woodall, Newport Beach, CA (US); Hongmin Zhang, Santa Clara, CA (US); Yue Ma, Los Altos, CA (US); Qinghai Wang, Shanghai (CN)

(73) Assignee: Pixelworks Semiconductor Technology (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 17/071,747

(22) Filed: Oct. 15, 2020

(65) Prior Publication Data
US 2022/0101504 A1   Mar. 31, 2022

(30) Foreign Application Priority Data
Sep. 28, 2020   (CN) .......................... 202011045833.1

(51) Int. Cl.
| G06T 5/50 | (2006.01) |
| A63F 13/42 | (2014.01) |
| G06T 1/60 | (2006.01) |
| G06T 3/40 | (2006.01) |
| G06T 7/20 | (2017.01) |
| H04N 19/51 | (2014.01) |

(52) U.S. Cl.
CPC ................ *G06T 5/50* (2013.01); *A63F 13/42* (2014.09); *G06T 1/60* (2013.01); *G06T 3/40* (2013.01); *G06T 7/20* (2013.01); *G06T 2207/10016* (2013.01); *G06T 2207/20221* (2013.01)

(58) Field of Classification Search
CPC ......... G06T 5/50; H04N 19/51; H04N 19/521
See application file for complete search history.

(56) References Cited

U.S. PATENT DOCUMENTS

| 2003/0122967 A1* | 7/2003 | Kondo ...................... H04N 5/21 348/610 |
| 2011/0115790 A1* | 5/2011 | Yoo .......................... G06T 7/579 345/419 |
| 2014/0204244 A1* | 7/2014 | Choi ................... H04N 5/23222 348/231.99 |

(Continued)

*Primary Examiner* — Yi Yang
(74) *Attorney, Agent, or Firm* — McCoy Russell LLP

(57) ABSTRACT

Various methods and systems are provided for accelerated image rendering with motion compensation. In one embodiment, a method comprises calculating motion between a preceding image frame and a target image frame to be rendered, rendering a small image with a size smaller than a target size of the target image frame based on the calculated motion, and generating the target image frame at the target size based on the small image, the calculated motion, and a reference image frame. In this way, high-quality image frames for a video stream may be generated with a reduced amount of rendering for each frame, thereby reducing the overall processing resources dedicated to rendering as well as the power consumption for image rendering.

14 Claims, 4 Drawing Sheets

(56) References Cited

U.S. PATENT DOCUMENTS

| | | | |
|---|---|---|---|
| 2014/0233833 A1* | 8/2014 | Bennett | G06Q 20/042 |
| | | | 382/137 |
| 2015/0134495 A1* | 5/2015 | Naware | G06Q 30/0643 |
| | | | 705/27.2 |
| 2016/0198118 A1* | 7/2016 | Kang | H04N 5/147 |
| | | | 348/700 |
| 2019/0045223 A1* | 2/2019 | Levy | H04N 19/30 |

* cited by examiner

METHODS AND SYSTEMS FOR ACCELERATED IMAGE RENDERING WITH MOTION COMPENSATION

CROSS REFERENCE TO RELATED APPLICATIONS

The present application claims priority to Chinese Patent Application No. 2020110458331, entitled "METHODS AND SYSTEMS FOR ACCELERATED IMAGE RENDERING WITH MOTION COMPENSATION," and filed on Sep. 28, 2020. The entire contents of the above-listed application is hereby incorporated by reference for all purposes.

FIELD

Embodiments of the subject matter disclosed herein relate to image rendering with motion compensation.

BACKGROUND

Over the years, an increase in computer processing power has enabled real-time video rendering, for example for video games or certain animations, to become increasingly sophisticated. For example, whereas early video games featured pixelated sprites moving on a fixed background, contemporary video games feature photorealistic three-dimensional scenes filled with characters. Meanwhile, the miniaturization of processing components has enabled mobile devices, such as handheld video game devices and smartphones, to effectively support real-time rendering of high-frame rate, high-resolution video.

BRIEF DESCRIPTION

In one embodiment, a method comprises calculating motion between a preceding image frame and a target image frame to be rendered, rendering a small image with a size smaller than a target size of the target image frame based on the calculated motion, and generating the target image frame at the target size based on the small image, the calculated motion, and a reference image frame. In this way, high-quality image frames for a video may be generated with a reduced amount of rendering for each frame, thereby reducing the overall processing resources dedicated to rendering as well as the power consumption for image rendering.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 4:
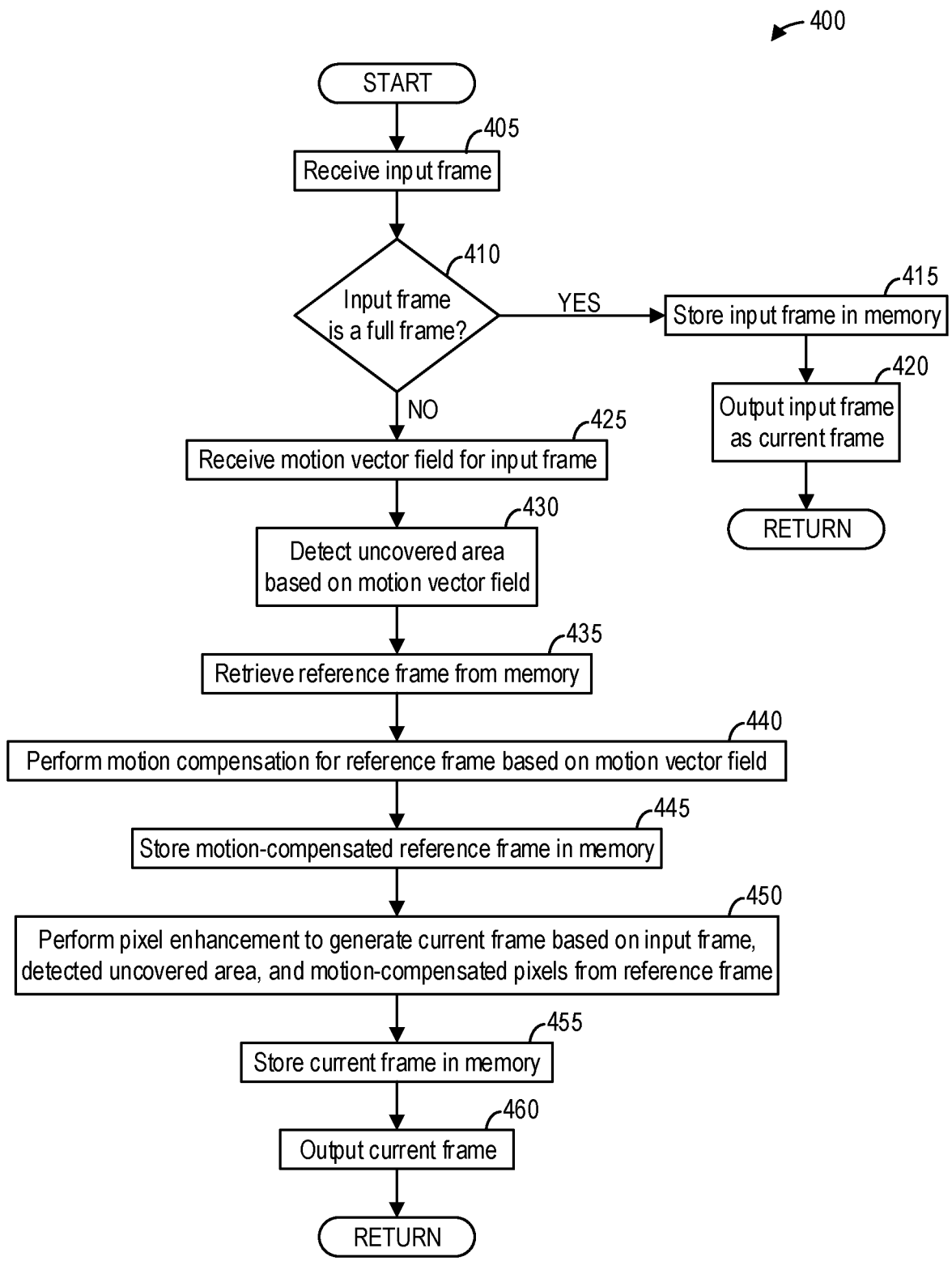
FIG. 4 shows a high-level flow chart illustrating an example method for performing motion-compensated image enhancement for rendered images, according to an embodiment.
Figure 5:
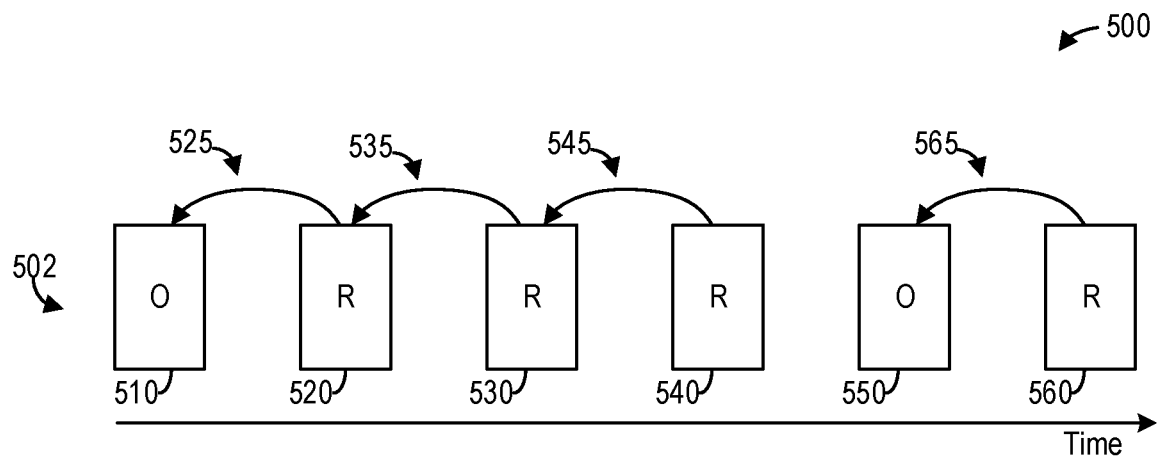
FIG. 5 shows a block diagram illustrating example motion vectors when using enhanced image frames as a reference frame, according to an embodiment.
Figure 6:
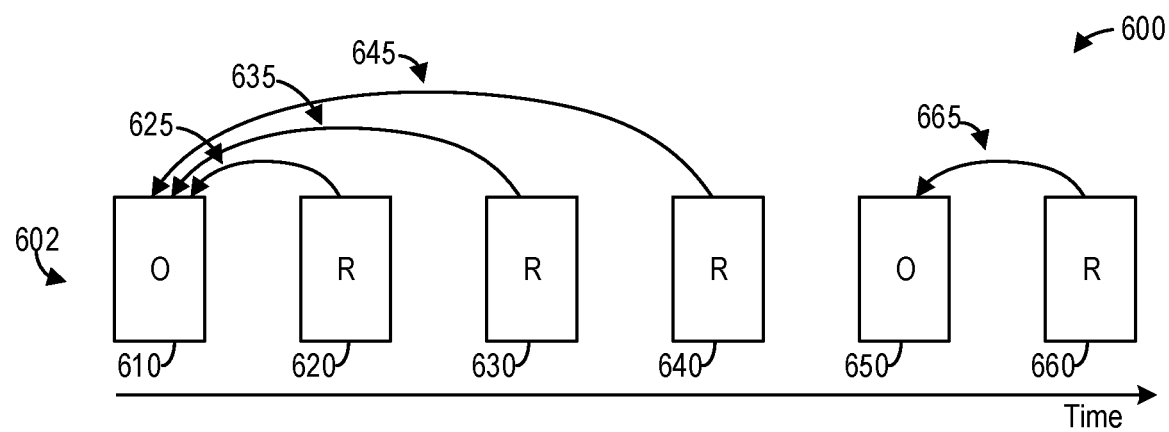
FIG. 6 shows a block diagram illustrating example motion vectors when using a full-size image frame as a reference frame, according to an embodiment.

The following description relates to various embodiments of image rendering. In particular, systems and methods are provided for accelerated image rendering with motion compensation. An image rendering system, such as the system depicted in FIG. 1, may include an image processor that renders image frames for display based on rendering commands received from one or more input sources. As image rendering may be complex, especially for games with increasingly complex environments as well as for display devices with high resolution and high frame rates, the processing power of image processors, such as graphics processing units (GPUs), is increased to meet the processing demands. However, the amount of power consumed by GPUs is proportional to the amount of pixels being rendered for display, and the power resources for GPUs may be constrained, for example in mobile devices. One approach to reducing the processing demands of GPUs while maintaining a high resolution and a high frame rate may include utilizing redundant pixels between neighboring frames to reduce the number of pixels that need to be rendered. For example, as depicted in FIG. 2, motion between frames may be analyzed and such motion may be used to determine which portions of the target frame to render, and the accumulated motion between frames may further be used to compensate for minor motion between corresponding pixels in frames rather than rendering the entire frame anew. A method for accelerated image rendering, such as the method depicted in FIG. 3, includes rendering the full frame only when there is a scene change or complex motion in the target frame. Otherwise, as depicted in FIG. 4, partial renders that are rendered may be enhanced with motion-compensated reference frames to generate the full target frame. In some examples, both full-size rendered image frames (e.g., original or O frames) and reconstructed full-size rendered frames (e.g., reconstructed or R frames, including enhanced partial renders) may be used as reference frames, as depicted in FIG. 5, while in other examples, only full-size rendered image frames may be used as reference frames, as depicted in FIG. 6. By copying over redundant regions in image frames, the overall processing demands may be reduced for GPUs, while maintaining high-resolution, high-frame rate rendered video for games and other rendering-based content for display.

Figure 1:
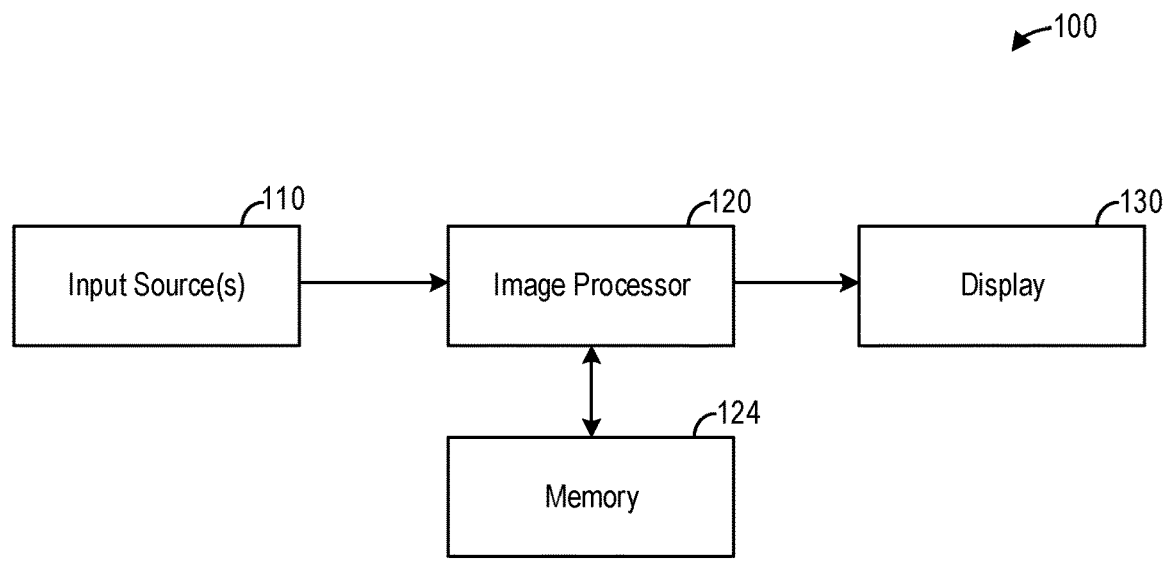
FIG. 1 shows a high-level block diagram illustrating an example image rendering system for accelerated image rendering with motion compensation, according to an embodiment.
Figure 2:
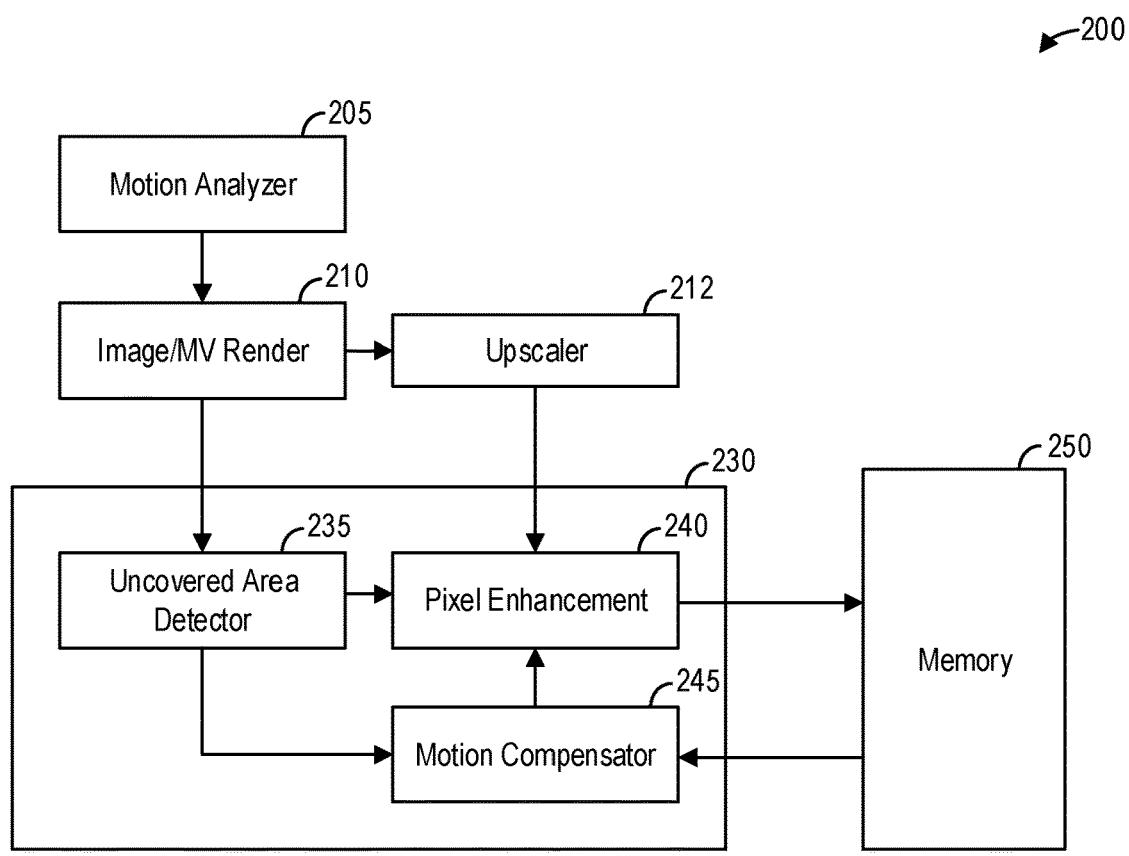
FIG. 2 shows a high-level block diagram illustrating example modules for accelerated image rendering with motion compensation, according to an embodiment.

FIG. 1 shows a high-level block diagram illustrating an example image rendering system 100 for processing output from one or more input sources 110 to render images for display. The components of the image rendering system 100 may be combined in a shared enclosure (not shown), in some examples. In other examples, one or more components of the image rendering system 100 may be configured as peripheral devices that may be communicatively coupled to form the image rendering system 100.

The image rendering system 100 comprises an image processor 120 configured to receive output of one or more input source(s) 110, render or generate images based on the received output of the one or more input source(s) 110, and output the rendered images for display via a display device 130. The image rendering system 100 further comprises a memory 124 communicatively coupled to the image processor 120 for providing local transitory and/or non-transitory storage.

The input source(s) 110 may comprise one or more components related to controlling the rendering of a game display. For example, the input source(s) 110 may include one or more user input devices, including but not limited to a keyboard, a mouse, a joystick, a headset, a microphone, a touchpad, and so on, configured to enable a user to provide input. The input source(s) 110 may further comprise a central processing unit (CPU), a memory controller, a system memory, a communication bus, and so on. As an illustrative and non-limiting example, the input source(s) 110 may include a user input device, a bus, a CPU, and a system memory, wherein the user input device is communicatively coupled via the bus to the CPU to provide user input relating to a video game, and wherein the CPU generates command packets that are transmitted to the image processor 120 to command rendering of images for display via the display device 130. In general, the input source(s) 110 provide input to the image processor 120 commanding the rendering of images for display via the display device 130.

The image processor 120 may comprise one or more physical devices configured to execute one or more instructions. For example, the image processor 120 may comprise one or more processors that are configured to execute software instructions. Additionally or alternatively, the image processor 120 may comprise one or more hardware or firmware logic machines configured to execute hardware or firmware instructions. The image processor 120 may be single or multi-core, and the programs executed thereon may be configured for parallel or distributed processing. In some examples, the image processor 120 comprises one or more graphics processing units (GPUs). Additionally or alternatively, in some examples the image processor 120 may comprise one or more CPUs configured to render images for display.

The imaging rendering system 100 further includes a memory 124 comprising non-transitory and transitory memory for storing instructions to be executed by the image processor 120 to perform the methods described further herein. The memory 124 may further provide a buffer and/or cache for storing data relating to the processing and/or rendering of image frames from the input source(s) 110, in order to support the functions of the image processor 120.

The image rendering system 100 further comprises a display 130 communicatively coupled to the image processor 120 and configured to display one or more image frames output by the image processor 120 to the display 130. That is, the image processor 120 may present a visual representation of data held or output by the image processor 120 and/or the memory 124. The display 130 may comprise a display device utilizing virtually any type of technology.

FIG. 2 shows a high-level block diagram illustrating example modules 200 for accelerated image rendering with motion compensation, according to an embodiment. The modules 200 may be implemented as executable instructions in memory 124, for example, and executable by the image processor 120.

The modules 200 include a motion analyzer module 205, an image/motion vector (MV) render module 210, an upscaler module 212, and a motion-compensated image enhancement module 230. The motion-compensated image enhancement module 230 comprises an uncovered area detector module 235, a pixel enhancement module 240, and a motion compensator module 245. Further, the motion-compensated image enhancement module 230 is communicatively coupled to a memory 250, which may comprise the memory 124 for example, for storing reference frames that may be subsequently retrieved from the memory 250 for motion-compensated image enhancement.

It should be appreciated that the modules 200 described herein may be implemented and provided with instructions having suitable structure in some examples. For example, the modules 200 may be implemented or created using a suitable software code written in a suitable language, wherein the code is then compiled to produce an executable program that may be run on a suitable computing system having a processor with the instructions stored in memory. Alternatively, or in conjunction with the executable program, the modules 200 may be implemented using a suitable mixture of hardware, firmware, or software, including software that is interpreted at runtime. For example, portions of the modules 200 may be implemented using an application specific integrated circuit (ASIC), a system-on-a-chip (SoC), field programmable gate arrays (FPGA), or another suitable adaptable or programmable processing device. As an illustrative example, one or more of the modules 200 may be implemented using a graphics processing unit (GPU) and/or by situating one or more of the modules 200 implemented as ASIC(s) and/or SoC(s) to form the GPU.

The motion analyzer module 205 receives rendering commands for a frame to be rendered (e.g., a current frame or target frame) as well as one or more preceding frames in a sequence of image frames, and outputs calculated motion between the frame to be rendered and at least one preceding frame. For example, the motion analyzer module 205 may analyze motion based on the output of the one or more input source(s) 110. In particular, the motion analyzer module 205 calculates the motion between a preceding image frame in a sequence of image frames and a current image frame or target image frame to be rendered in the sequence of image frames. The motion analyzer module 205 further determines, based on the determined motion between the preceding frame and the current frame, if the accumulated motion between the frames is complex. The motion analyzer module 205 may further determine whether a scene change occurs between the preceding frame and the current frame. If the motion is complex and the current frame is a scene change frame, the motion analyzer module 205 commands the image/MV render module 210 to render a full-size image frame, or an original (O) frame, for the current frame. That is, the motion analyzer module 205 commands the image/MV render module 210 to render the entire current frame. However, if the motion is not too complex and the current frame is not a scene change frame, then the motion analyzer module 205 instead commands the image/MV render module 210 to generate a small image that is smaller in size and/or resolution than an O frame. The small image may comprise a partial image render corresponding to an uncovered region or a region of the current frame containing complex motion (e.g., only a portion of the full-size target image), a downscaled image of the entire current frame, or a downscaled partial image render. Further, it should be appreciated that the smaller resolution of the small image indicates that the small image is rendered with fewer pixels than the full-size image frame, rather than reducing the frequency response.

The image/MV render module 210 may comprise a rendering engine that generates or renders a visualization or image responsive to and based on rendering commands (e.g., vertex information). As described further herein, the image/MV render module 210 generates a full-size image (e.g., an O frame) for the current frame or at least one small image for the current frame based on the motion between the current frame or target frame and a preceding frame as calculated by the motion analyzer module 205. When the image/MV render module 210 generates one or more small images, the image/MV render module 210 further generates a motion vector (MV) field for the current frame to accompany the small image. In some examples, the image/MV render module 210 may generate the MV field at a lower resolution to reduce cost.

If the image/MV render module 210 generates an O frame for the current frame, the full-size current frame is passed to the motion-compensated image enhancement module 230 which in turn stores the O frame in memory 250 as a reference frame. The O frame is also output as the current frame for display.

If the image/MV render module 210 generates one or more small images at a lower resolution than the desired resolution for the current frame, the one or more small images are upscaled by the upscaler module 212 to the desired resolution. The upscaler module 212 may comprise a conventional two-dimensional scaler, in some examples, configured to interpolate pixels to generate small image(s) with the desired resolution. The upscaler module 212 may thus be implemented as software, firmware, or hardware configured to receive a small image, upscale the small image to an upscaled image, and output the upscaled image.

The one or more small images rendered at the desired resolution by the image/MV render module 210 and/or the one or more small images rendered by the image/MV render module 210 at a lower resolution than the desired resolution and then upscaled by the upscaler module 212 are input to the motion-compensated image enhancement module 230. In either example, a small image at the desired resolution comprises an R frame, in contrast with an O frame.

The motion-compensated image enhancement module 230 receives both O and R frames from the image/MV render module 210 and/or the upscaler module 212. If the current frame is an O frame, the motion-compensated image enhancement module 230 writes the O frame to memory 250 as a reference frame. If the current frame is an R frame, the motion-compensated image enhancement module 230 enhances the R frame with a previous enhanced frame and/or a previous O frame to generate the full-size current frame. For example, the motion-compensated image enhancement module 230 replaces low-quality pixel regions in the R frame with high-quality pixels from the reference frame (i.e., the previous enhanced frame and/or the previous O frame), except for the uncovered areas. The motion-compensated image enhancement module 230 stores the enhanced R frame in memory 250 as a reference frame.

To perform the motion-compensated image enhancement, the uncovered area detector module 235 of the motion-compensated image enhancement module 230 detects one or more uncovered areas in the one or more R frames received from the image/MV render module 210 and/or the upscaler module 212. To that end, the uncovered area detector module 235 uses the MV field received from the image/MV render module 210 to detect the uncovered areas. The uncovered area detector module 235 outputs the uncovered areas detected to the pixel enhancement module 240. Meanwhile, the motion compensator module 245 retrieves, from the memory 250, a reference frame comprising a preceding O frame or a preceding enhanced R frame. The motion compensator module 245 uses the MV field for the current frame to perform motion compensation on the reference frame. The motion-compensated reference frame is then provided by the motion compensator module 245 to the pixel enhancement module 240.

The pixel enhancement module 240 performs pixel enhancement of the R frame according to the uncovered area detector module 235 based on the MV field. If there are upscaled low-quality pixels, the pixel enhancement module 240 merges or blends such pixels with the corresponding motion-compensated pixels from the motion-compensated reference frame. For regions of the R frame where there is not an uncover issue, the motion-compensated pixels from the motion-compensated reference frame may replace the corresponding pixels in the R frame, which may be empty as the image/MV render module 210 did not render pixels in these regions. If there is a brightness change, the pixel enhancement module 240 adjusts the motion-compensated pixels to account for the brightness difference. For the uncovered region(s) in the R frame, since there are no corresponding regions in the O frame, the pixel enhancement module 240 maintains the pixels in the uncovered region(s) for the current frame as these pixels were rendered by the image/MV render module 210 in the small image(s).

In addition to or as an alternative to detecting uncovered area(s) using the MV field, uncovered regions may be detected using a pixel-level detection. To blend pixels based on a pixel-level detection, the motion-compensated pixel enhancement module 230 may calculate the change (Delta) for a given pixel at position (i,j) between the R frame and the reference frame O':

$$\text{Delta}(i,j)=\text{Abs}(R(i,j)-\text{Median}(O'(i+y,j+x),\text{LowPass}(O'(i+y,j+x)),R)),$$

where the reference frame O' may comprise an original O frame or an enhanced/reconstructed R frame, O'(i+y,j+x) comprises the motion-compensated reference frame, and (x,y) comprise motion at the horizontal and vertical directions respectively. Alternatively, the change may be calculated as:

$$\text{Delta}(i,j)=\text{Abs}(R(i,j)-\text{Median}(\text{Max}3\times3(O'(i+y,j+x)),\text{Min}3\times3(O'(i+y,j+x)),R(i,j)).$$

If Delta is large for a pixel, then the pixel R(i,j) from the R frame is selected. If Delta is small, then the pixel O'(i+y,j+x) from the motion-compensated reference frame is selected. The blending output may then comprise:

$$\text{Output}(i,j)=O'(i+y,j+x)+\text{Delta}_{adjusted},$$

Further, the Delta may be summed in a 5×5 pixel window, and if the summed Delta is large, the corresponding pixels of the R frame are selected.

Further, as the method for upscaling the low-resolution images to the full-resolution before combining the upscaled images with the full-resolution reference image, the pixel enhancement module 240 may selectively combine the reference image and the upscaled image based on the upscaling method. For example, if the low-resolution image is a sub-sampled version of the full-resolution image, and an upscaled pixel is an original pixel, then the upscaled pixel may have more weight in blending of the images than a corresponding reference pixel.

Figure 3:
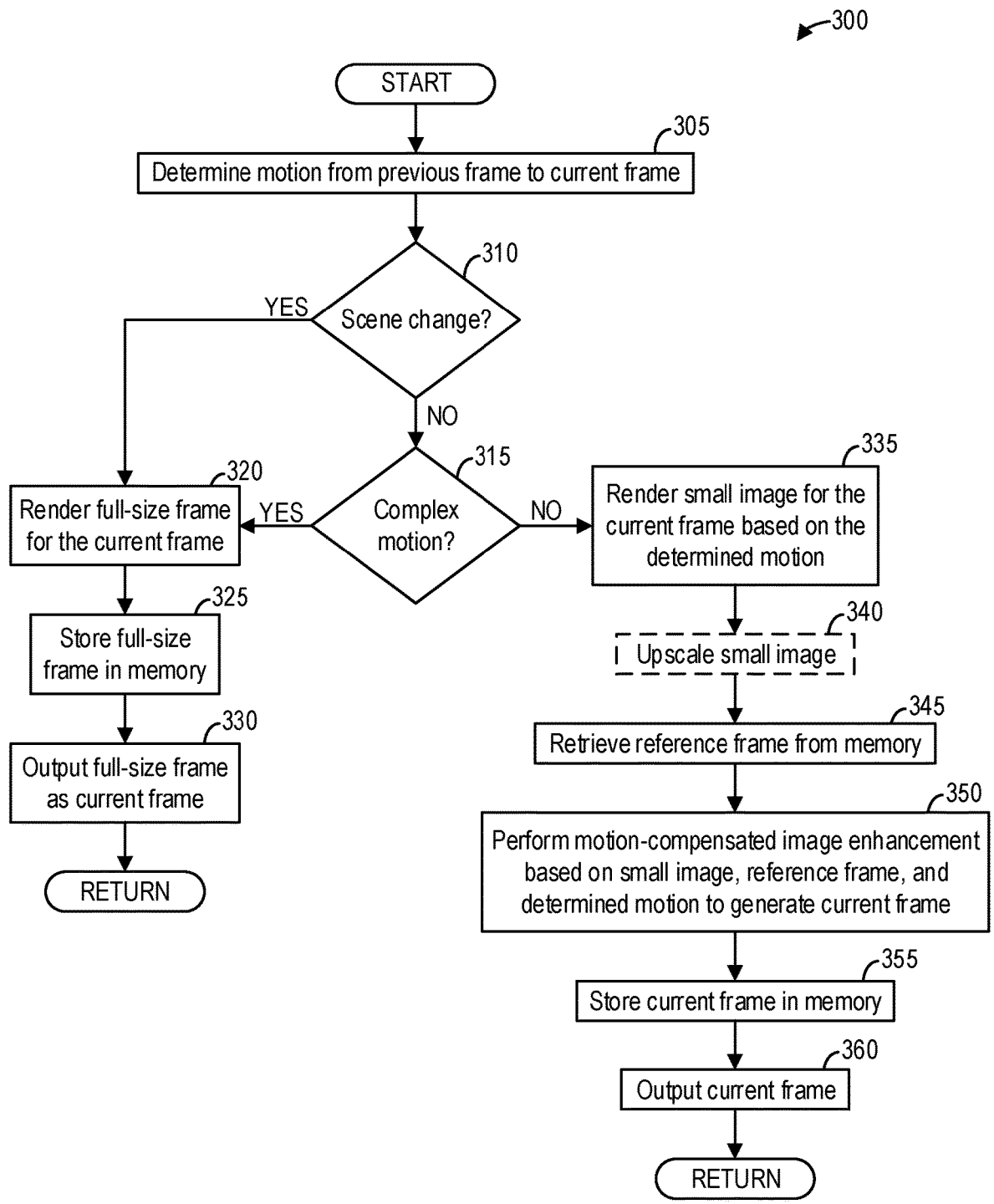
FIG. 3 shows a high-level flow chart illustrating an example method for image rendering based on estimated motion between image frames, according to an embodiment.

FIG. 3 shows a high-level flow chart illustrating an example method 300 for image rendering based on estimated motion between image frames, according to an embodiment. In particular, method 300 relates to partially rendering an image and enhancing the partially-rendered image with a reference frame, thereby reducing the computational expense for rendering images. Method 300 is described with regard to the systems and components of FIGS. 1 and 2, though it should be appreciated that the method 300 may be implemented with other systems and components without departing from the scope of the present disclosure. Method 300 may be implemented as instructions in memory 124, for example, executable by the image processor 120 to perform the actions described herein.

Method 300 begins at 305. At 305, method 300 determines motion between a previous frame to a current frame. For example, method 300 analyzes the motion between a previous frame and the current frame or target frame by analyzing or evaluating the rendering commands for the target frame.

At 310, method 300 determines whether the current frame includes a scene change relative to the previous frame. For example, if the rendering commands indicate that the entire scene is changing in the current frame relative to the previous frame, then the number of redundant pixels between the frames may be minimal. If the current frame includes a scene change ("YES"), method 300 continues to 320. However, if the current frame does not include a scene change ("NO"), method 300 continues to 315.

At 315, method 300 determines whether the determined motion indicates that the current frame includes complex motion relative to the previous frame. Motion between frames may be determined to be complex if a threshold amount of motion is identified across a threshold region of the image frame, or from one region to an adjacent region. Such thresholds may be selected such that above a threshold amount of motion, motion compensation techniques may not accurately compensate for the motion, while significant motion across a threshold region of the image frame indicates that a substantial portion of the image frame, such as a majority of the image frame, contains the threshold amount of motion. Further, large motion by itself is not an issue if all blocks/regions are moving in the same direction, however, when such motion changes the motion may be considered complex.

If the current frame includes complex motion ("YES"), method 300 continues to 320. At 320, method 300 renders a full-size frame for the current frame. Thus, if the motion in the current frame determined at 305 indicates a scene change at 310 or complex motion at 315, method 300 renders a full-size frame for the current frame. For example, the image/MV render module 210 renders an O frame for the current frame, as discussed hereinabove. In this way, target frames that do not include a substantial amount of redundant pixels relative to a preceding frame may be rendered in full. At 325, method 300 stores the full-size frame in memory, such as the memory 250. The full-size frame may thus be retrieved later as a reference frame for accelerating image rendering. At 330, method 300 outputs the full-size frame as the current frame. The current frame may be displayed, for example, via the display 130. Method 300 then returns.

However, referring again to 315, if the current frame does not include complex motion ("NO"), method 300 continues to 335. At 335, method 300 renders a small image for the current frame based on the determined motion. For example, method 300 may render a small image comprising a portion of the target frame or the current frame wherein substantial motion occurs, and may not render the remaining regions of the target frame or current frame wherein substantial motion does not occur. As another example, method 300 may render a small image comprising the entire target frame but at a lower resolution. As yet another example, method 300 may render a small image comprising the portion of the current frame wherein substantial motion occurs, but at a lower resolution than a desired resolution of the current frame. If a small image with a lower resolution is rendered at 335, then at 340, method 300 optionally upscales the small image to the desired resolution of the current frame.

Continuing at 345, method 300 retrieves a reference frame from memory, such as the memory 250. The reference frame may comprise a preceding enhanced partial render (e.g., an enhanced R frame) or a preceding full-size frame (e.g., O frame).

At 350, method 300 performs motion-compensated image enhancement based on the small image, the reference frame, and the determined motion to generate the current frame. For example, method 300 performs motion compensation on the reference frame based on the determined motion to obtain a motion-compensated reference frame. Further, method 300 fills empty pixels in the R frame containing the small image, for example, with corresponding pixels from the motion-compensated reference frame. Additionally or alternatively, method 300 selectively blends low-quality pixels in the R frame with the relatively higher quality, motion-compensated pixels of the motion-compensated reference frame. The current frame thus obtained may therefore include at least the small image, enhanced via blending and/or replacement of pixels from the motion-compensated reference frame, wherein the enhancement may further be determined based on the determined motion (e.g., based on a MV field).

At 355, method 300 stores the current frame generated at 350 in memory. As the current frame generated at 350 comprises an enhanced R frame, in some examples the current frame generated at 350 may be retrieved for enhancing subsequent image frames. At 360, method 300 outputs the current frame generated at 350 for display, for example via the display 130. Method 300 then returns.

FIG. 4 shows a high-level flow chart illustrating an example method 400 for performing motion-compensated image enhancement for rendered images, according to an embodiment. In particular, method 400 relates to how a motion-compensated image enhancement module, such as the motion-compensated image enhancement module 230, processes input frames to generate a current frame or target frame. Method 400 is described with regard to the systems and components of FIGS. 1 and 2 as well as the method 300 of FIG. 3, though it should be appreciated that the method 400 may be implemented with other systems, components, and methods without departing from the scope of the present disclosure. Method 400 may be implemented as instructions in memory 124, for example, executable by the image processor 120 to perform the actions described herein.

Method 400 begins at 405. At 405, method 400 receives an input frame. The input frame comprises an original O frame or an R frame rendered and output by the image/MV render module 210, for example.

At 410, method 400 determines whether the input frame is an O frame, or a full-size image frame. If the input frame is an O frame ("YES"), method 400 continues to 415. At 415, method 400 stores the input frame in memory for use as a reference frame for subsequent image frames. At 420, method 400 outputs the input frame as the current frame for display. Method 400 then returns. Thus, if the image/MV render module 210 renders a full-size image frame for the current frame, additional motion compensation and image enhancement is not necessary and the image is output.

However, referring again to 410, if the input frame is not an O frame ("NO"), method 400 continues to 425. At 425, method 400 receives a motion vector field for the input frame. At 430, method 400 detects one or more uncovered areas based on the motion vector field. The input frame comprises an R frame including at least a portion of the current frame rendered. The uncovered area(s) may correspond to the portion of the current frame that is already rendered.

At 435, method 400 retrieves a reference frame from memory. The reference frame may comprise a preceding O frame or a preceding enhanced R frame. At 440, method 400 performs motion compensation for the reference frame based on the motion vector field. At 445, method 400 stores the motion-compensated reference frame in memory.

At 450, method 400 performs pixel enhancement to generate the current frame based on the input frame, the detected uncovered area(s), and the motion-compensated pixels from the reference frame. For example, method 400 selectively blends motion-compensated pixels of the motion-compensated reference frame with the pixels of the input frame, so that low-quality or missing pixels in the input frame are blended or replaced, respectively, with the motion-compensated pixels of the motion-compensated reference frame. For uncovered areas, pixel enhancement is performed to ensure appropriate brightness across the current frame, thereby eliminating potential discontinuities caused by the integration of one or more small images with pixels from the motion-compensated reference image.

At 455, method 400 stores the current frame in memory, so that the current frame may be retrieved later as a reference frame. At 460, method 400 outputs the current frame for display. Method 400 then returns.

In some examples, the reference frame in memory may comprise a most recent image frame, which may comprise an O frame or an enhanced R frame. In such examples, the motion vector fields generated for R frames indicates the motion between the R frame and the preceding frame. FIG. 5 shows a block diagram illustrating example motion vectors for a sequence 500 of image frames 502 when using both enhanced R frames and O frames are used as a reference frame, according to an embodiment. As depicted, the first image frame 510 in the sequence 500 of image frames 502 comprises an O frame, while the second image frame 520 comprises an R frame. The motion vector 525 for the second image frame 520 is therefore a motion vector between the first image frame 510 and the second image frame 520. Similarly, the third image frame 530 comprises an R frame, and the motion vector 535 for the third image frame 530 comprises a motion vector between the second (enhanced) image frame 520 and the third image frame 530. The fourth image frame 540 also comprises an R frame, and so the motion vector 545 for the fourth image frame 540 comprises a motion vector between the third (enhanced) image frame 530 and the fourth image frame 540. The fifth image frame 550 comprises an O frame, and so a motion vector is not necessary for the fifth image frame 550. The sixth image frame 560, however, comprises an R frame, and the motion vector 565 generated for the sixth image frame 560 comprises a motion vector between the fifth image frame 550 and the sixth image frame 560.

In other examples, the reference frame stored in memory is always an O frame. In such examples, the motion vector field for an R frame may be determined based on the O frame. FIG. 6 shows a block diagram illustrating example motion vectors for a sequence 600 of image frames 602 when using only O frames as a reference frame, according to an embodiment. As depicted, the first image frame 610 of the sequence 600 of image frames 602 comprises an O frame. The second image frame 620 comprises an R frame, and so the motion vector 625 for the second image frame 620 comprises the motion vector between the first image frame 610 and the second image frame 620. However, the third image frame 630 is also an R frame, and the motion vector 635 for the third image frame 630 comprises the motion vector between the first image frame 610 and the third image frame 630, since the first image frame 610 is an O frame and the second image frame 620 is an R frame. Similarly, the fourth image frame 640 is an R frame, and the motion vector 645 for the fourth image frame 640 comprises a motion vector between the first image frame 610 and the fourth image frame 640, as the first image frame 610 is the most recent O frame in the sequence 600 of image frames 602. The fifth image frame 650 comprises an O frame, and therefore a motion vector is not generated for the fifth image frame 650. The sixth image frame 660 comprises an R frame, and the motion vector 665 for the sixth image frame 660 comprises a motion vector between the most recent O frame, the fifth image frame 650, and the sixth image frame 660.

Thus, various embodiments of accelerated image rendering with motion compensation are provided. In one embodiment, a method comprises calculating motion between a preceding image frame and a target image frame to be rendered, rendering a small image with a size smaller than a target size of the target image frame based on the calculated motion, and generating the target image frame at the target size based on the small image, the calculated motion, and a reference image frame.

In a first example of the method, generating the target image frame at the target size comprises performing motion compensation of the reference image frame based on motion between the reference image frame and the target image frame. In a second example of the method optionally including the first example, the reference image frame comprises the preceding image frame, and wherein the motion between the reference image frame and the target image frame comprises the calculated motion. In a third example of the method optionally including one or more of the first and second examples, generating the target image frame at the target size further comprises selecting motion-compensated pixels of the motion-compensated reference image frame for the target image frame based on the calculated motion. In a fourth example of the method optionally including one or more of the first through third examples, generating the target image frame at the target size further comprises selectively blending motion-compensated pixels of the motion-compensated reference image frame with the small image in the target image frame. In a fifth example of the method optionally including one or more of the first through fourth examples, the method further comprises upscaling the small image to a target resolution of the target image frame. In a sixth example of the method optionally including one or more of the first through fifth examples, the method further comprises determining that the target image frame includes a scene change or complex motion relative to the preceding image frame, rendering the target image frame at the target size, and not rendering the small image. In a seventh example of the method optionally including one or more of the first through sixth examples, the method further comprises determining that a predetermined number of preceding images were rendered at a lower resolution, rendering the target image frame at the target size, and not rendering the small image.

In another embodiment, a method comprises determining motion between a preceding image frame and a target image frame, responsive to the determined motion indicating a scene change or complex motion, rendering the target image frame, and otherwise rendering a small image based on the determined motion, and generating the target image frame based on the small image and a motion-compensated reference image frame.

In a first example of the method, the method further comprises generating the motion-compensated reference image frame by applying motion compensation to a reference image frame based on motion between the target image frame and the reference image frame. In a second example of the method optionally including the first example, the small image comprises a portion of the target image frame, and the method further comprises filling remaining regions of the target image frame away from the small image with pixels of the motion-compensated reference image frame. In a third example of the method optionally including one or more of the first and second examples, the method further comprises selectively blending pixels of the small image with pixels of the motion-compensated reference image frame. In a fourth example of the method optionally including one or more of the first through third examples, the method further comprises adjusting brightness of the pixels of the motion-compensated reference image frame based on a brightness of pixels of the small image. In a fifth example of the method optionally including one or more of the first through fourth examples, the method further comprises storing the target image frame in memory for use as a reference image frame for at least one subsequent image frame.

In yet another embodiment, a system comprises an image processor configured with instructions in non-transitory memory that when executed cause the image processor to: calculate motion between a preceding image frame and a target image frame to be rendered; render a small image with a size smaller than a target size of the target image frame based on the calculated motion; and generate the target image frame at the target size based on the small image, the calculated motion, and a reference image frame.

In a first example of the system, generating the target image frame at the target size comprises performing motion compensation of the reference image frame based on motion between the reference image frame and the target image frame. In a second example of the system optionally including the first example, the reference image frame comprises the preceding image frame, and wherein the motion between the reference image frame and the target image frame comprises the calculated motion. In a third example of the system optionally including one or more of the first and second examples, generating the target image frame at the target size further comprises selecting motion-compensated pixels of the motion-compensated reference image frame for the target image frame based on the calculated motion. In a fourth example of the system optionally including one or more of the first through third examples, generating the target image frame at the target size further comprises selectively blending motion-compensated pixels with the small image in the target image frame. In a fifth example of the system optionally including one or more of the first through fourth examples, the image processor is further configured with instructions in non-transitory memory that when executed cause the image processor to upscale the small image to a target resolution of the target image frame. In a sixth example of the system optionally including one or more of the first through fifth examples, the image processor is further configured with instructions in non-transitory memory that when executed cause the image processor to determine that the target image frame includes a scene change or complex motion relative to the preceding image frame, render the target image frame at the target size, and not render the small image.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   determining a motion between a preceding image frame of a sequence of image frames to be rendered and a reference image frame;
   rendering a small image for the preceding image frame, the rendered image having a resolution lower than the reference image frame;
   upscaling the rendered image to a target resolution of the reference image frame;
   detecting one or more areas of the rendered image to be blended;
   adjusting brightness of the pixels of a motion-compensated stored reference image frame based on a brightness of the pixels of the rendered image; and
   generating an output image frame at a target size based on both the rendered image and the motion-compensated stored reference image frame corresponding with a preceding output image frame,
   wherein, within the one or more areas of the rendered image to be blended, pixels of the output image frame are the corresponding pixels of the rendered image blended with the corresponding pixels of the motion-compensated stored reference image frame; and
   wherein, outside of the one or more areas of the rendered image to be blended, pixels of the output image frame are the corresponding pixels of the rendered image or the reference image frame.

2. The method of claim 1, wherein generating the output image frame at the target size comprises performing motion compensation of a stored reference image frame based on motion between the stored reference image frame and the rendered image.

3. The method of claim 2, wherein the stored reference image frame corresponds with the most recent preceding output image frame.

4. The method of claim 1, wherein the detecting of the one or more areas of the rendered image to be blended includes detecting pixel-level differences between pixels of a rendered image and pixels of the motion-compensated stored reference image frame.

5. The method of claim 1, wherein the motion between the preceding image frame and reference image frame is below a threshold amount of motion.

6. A method, comprising:
 determining a motion between a preceding image frame of a sequence of image frames to be rendered and a reference image frame;
 rendering a small image for the preceding image frame, the rendered image having a resolution lower than the reference image frame;
 upscaling the rendered image to a target resolution of the reference image frame;
 detecting one or more areas of the rendered image to be blended;
 adjusting brightness of the pixels of a motion-compensated stored reference image frame based on a brightness of the pixels of the rendered image;
 generating an output image frame at a target size based on the rendered image and the motion-compensated stored reference image frame corresponding with a preceding output image frame; and
 filling regions of the output image frame away from the rendered image with pixels of the motion-compensated stored reference image frame responsive to the determined motion not indicating a scene change or a complex motion,
 wherein, within the one or more areas of the rendered image to be blended, pixels of the output image frame are the corresponding pixels of the rendered image blended with the corresponding pixels of the motion-compensated stored reference image frame; and
 wherein, outside of the one or more areas of the rendered image to be blended, pixels of the output image frame are the corresponding pixels of the rendered image or the reference image frame.

7. The method of claim 6, further comprising generating the motion-compensated stored reference image frame by applying motion compensation to a stored reference image frame based on motion between the rendered image and the stored reference image frame.

8. The method of claim 6, further comprising storing the output image frame in a memory for use as a reference image frame for at least one subsequent output image frame.

9. The method of claim 6, wherein the detecting of the one or more areas of the rendered image to be blended includes detecting pixel-level differences between pixels of the rendered image and pixels of the motion-compensated stored reference image frame.

10. A system, comprising:
 an image processor configured with instructions in non-transitory memory that when executed cause the image processor to:
  determine a motion between a preceding image frame of a sequence of image frames to be rendered and a reference image frame;
  rendering a small image for the preceding image frame, the rendered image having a resolution lower than the reference image frame;
  upscaling the rendered image to a target resolution of the reference image frame;
  detect one or more areas of the rendered image to be blended;
  adjusting brightness of the pixels of a motion-compensated stored reference image frame based on a brightness of the pixels of the rendered image; and
  generate an output image frame at a target size based on both the rendered image and the motion-compensated stored reference image frame corresponding with a preceding output image frame,
 wherein, within the one or more areas of the rendered image to be blended, pixels of the output image frame are the corresponding pixels of the rendered image blended with the corresponding pixels of the motion-compensated stored reference image frame; and
 wherein, outside of the one or more areas of the rendered image to be blended, pixels of the output image frame are the corresponding pixels of the rendered image or the reference image frame.

11. The system of claim 10, wherein generating the output image frame at the target size comprises performing motion compensation of a stored reference image frame based on motion between the stored reference image frame and the rendered image.

12. The system of claim 11, wherein the stored reference image frame corresponds with the most recent preceding output image frame.

13. The system of claim 10, wherein the detecting of the one or more areas of the rendered image to be blended is based on a motion vector field.

14. The system of claim 10, wherein the detecting of the one or more areas of the rendered image to be blended includes detecting pixel-level differences between pixels of the rendered image and pixels of the motion-compensated stored reference image frame.

* * * * *